United States Patent [19]

Meratti et al.

[11] 4,255,074

[45] Mar. 10, 1981

[54] PALLETIZING MACHINE

[75] Inventors: Gianattilio Meratti, Torre de' Roveri; Eugenio Madaschi, Albano S. Alesseandro, both of Italy

[73] Assignee: Meccanotecnica S.p.A., Bergamo, Italy

[21] Appl. No.: 57,857

[22] Filed: Jul. 16, 1979

[30] Foreign Application Priority Data

Jul. 25, 1978 [IT] Italy ................................ 68772 A/78

[51] Int. Cl.$^3$ ............................................ B65G 57/24
[52] U.S. Cl. ...................................... 414/62; 198/485; 198/614; 414/66; 414/68; 414/85
[58] Field of Search ...................... 414/62, 65, 66, 68, 414/82, 84, 85; 198/457, 485, 614, 775

[56] References Cited

U.S. PATENT DOCUMENTS

| | | | |
|---|---|---|---|
| 2,960,243 | 11/1960 | Beaulieu | 414/82 |
| 3,045,802 | 7/1962 | Miller | 414/62 X |
| 3,247,981 | 4/1966 | Johnson | 414/82 X |
| 3,737,019 | 6/1973 | Coleman et al. | 198/485 X |
| 3,941,048 | 3/1976 | Oe et al. | 414/82 |
| 4,010,843 | 3/1977 | Lucas | 198/614 X |
| 4,195,959 | 4/1980 | Schmitt | 414/85 X |
| 4,199,287 | 4/1980 | Salts | 414/68 |

Primary Examiner—Leslie J. Paperner
Attorney, Agent, or Firm—Sughrue, Rothwell, Mion, Zinn & Macpeak

[57] ABSTRACT

A palletizing machine for stacking rows of articles in layers on a pallet, includes an entry station for accummulating a row of articles, an intermediate support for receiving from the entry station a sufficient number of rows of articles to constitute a layer of articles on the pallet, and a pallet support vertically movable in a main framework of the machine to position the upper level of a pallet or partially loaded pallet just below the level of the intermediate support so that a layer of articles accumulated thereon can be readily tranferred to the pallet. To facilitate the handling of articles such as piles of books, both the entry station and the intermediate support are provided with roller beds. Furthermore, the intermediate support is formed as a carriage moving between the entry station and above the pallet and has a comb-like receiving section which can be positioned beneath a row of articles lifted off the entry station roller bed by a lifting device of the machine; subsequent lowering of the lifting device depositing the lifted row onto the carriage. Transfer of the rows from the carriage onto the pallet is effected by preventing movement of these rows with the carriage as it moved away from above the pallet.

10 Claims, 11 Drawing Figures

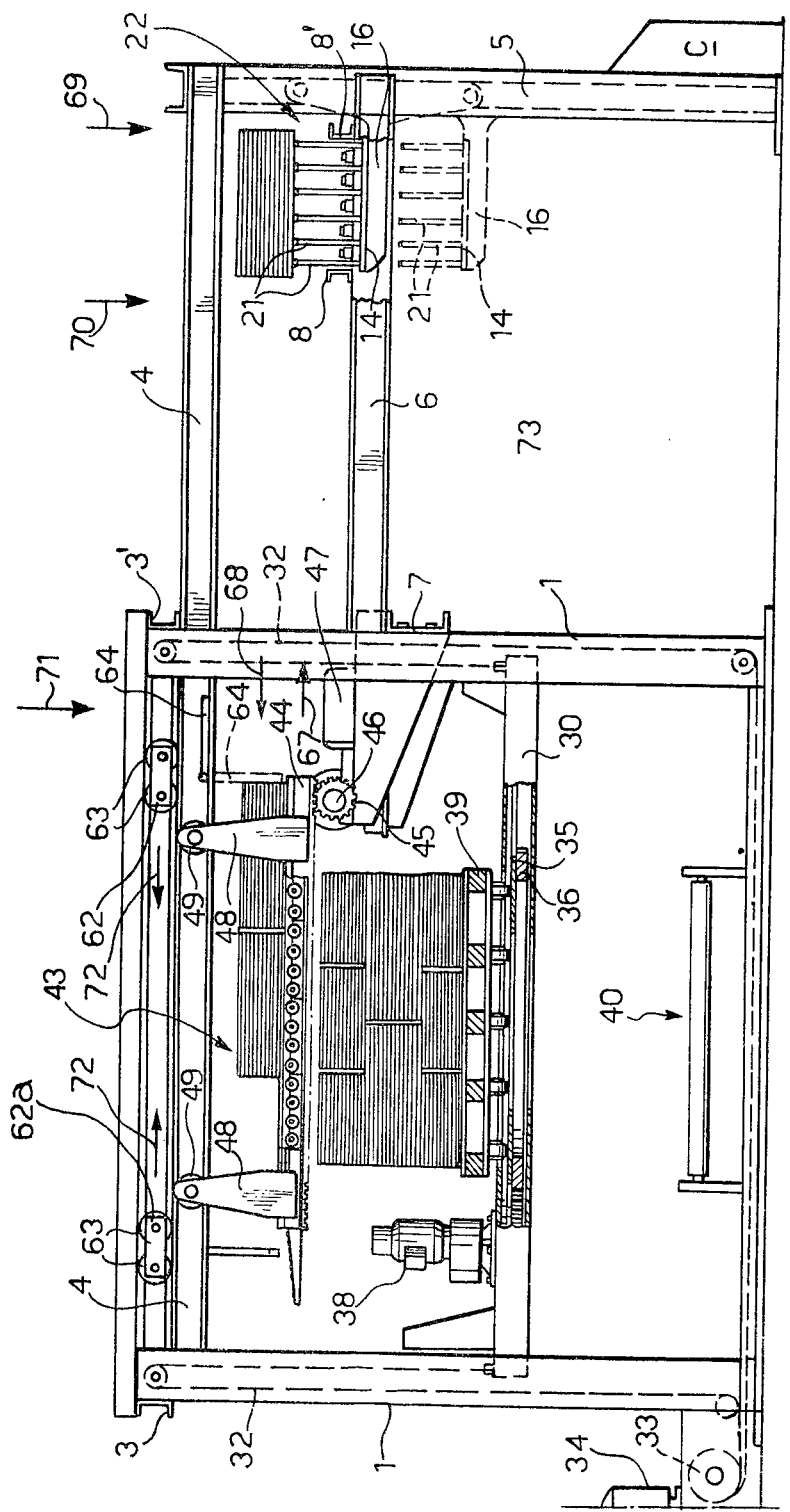

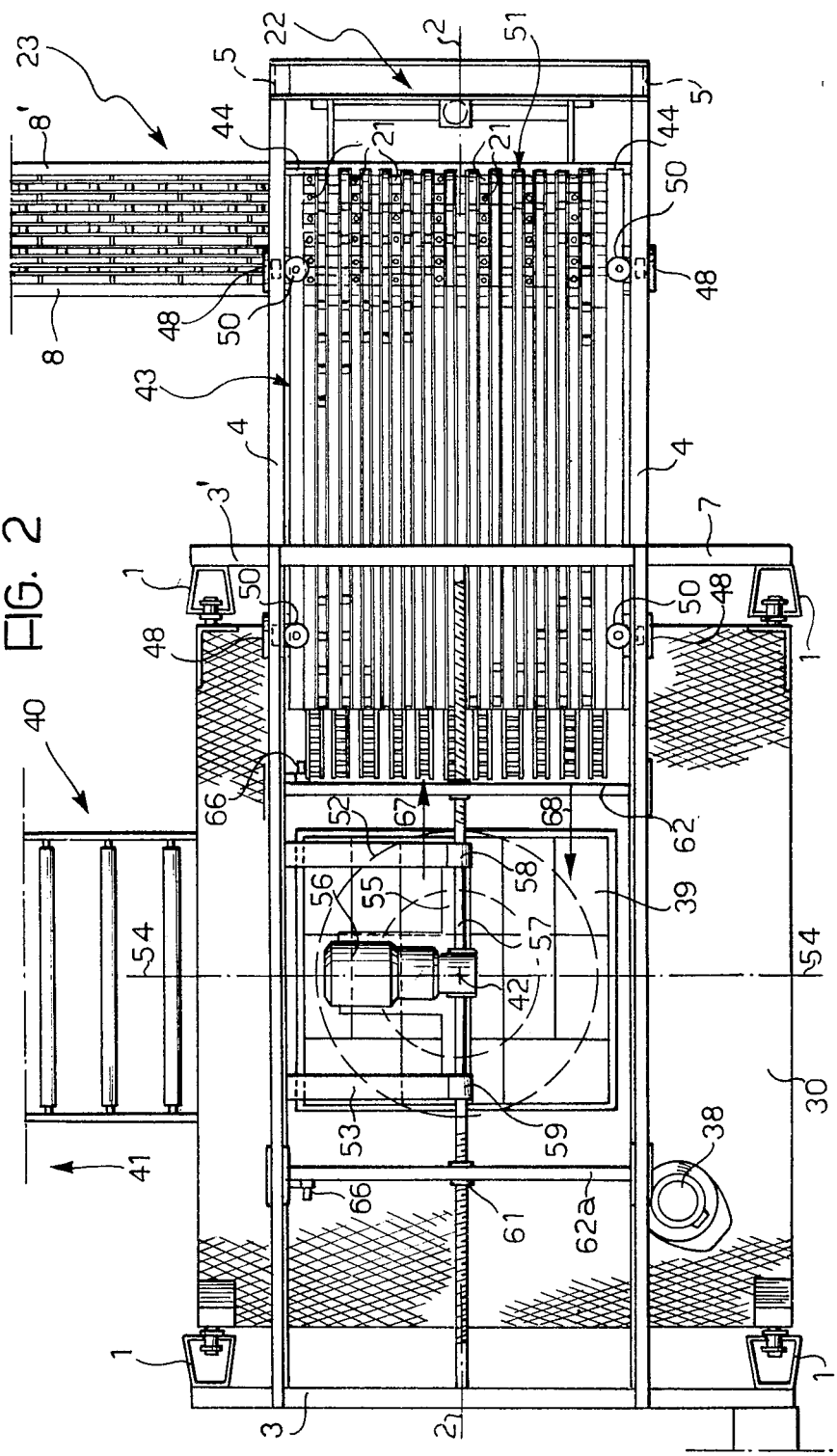

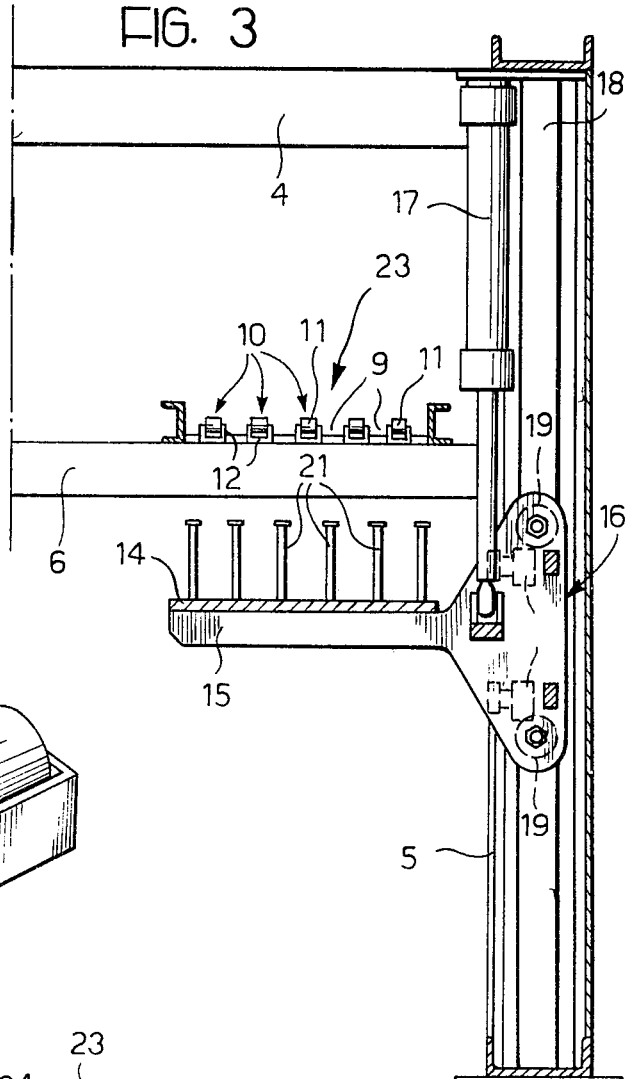
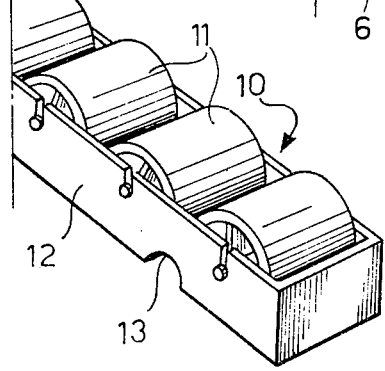
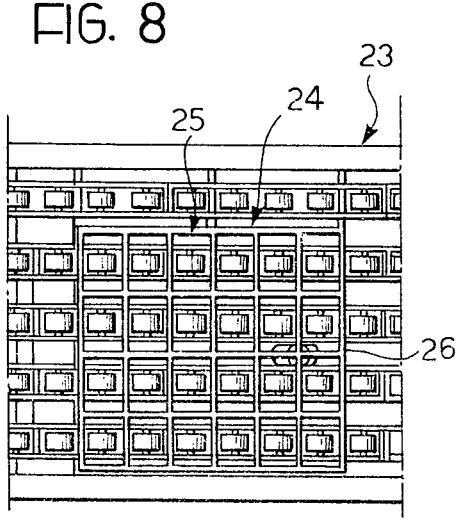
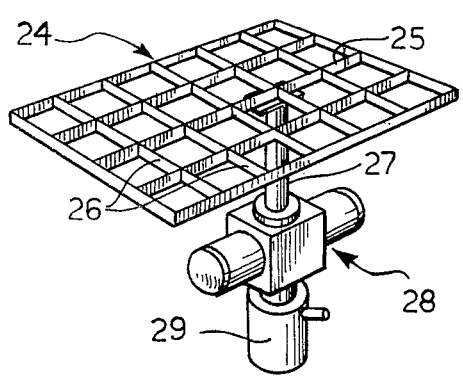

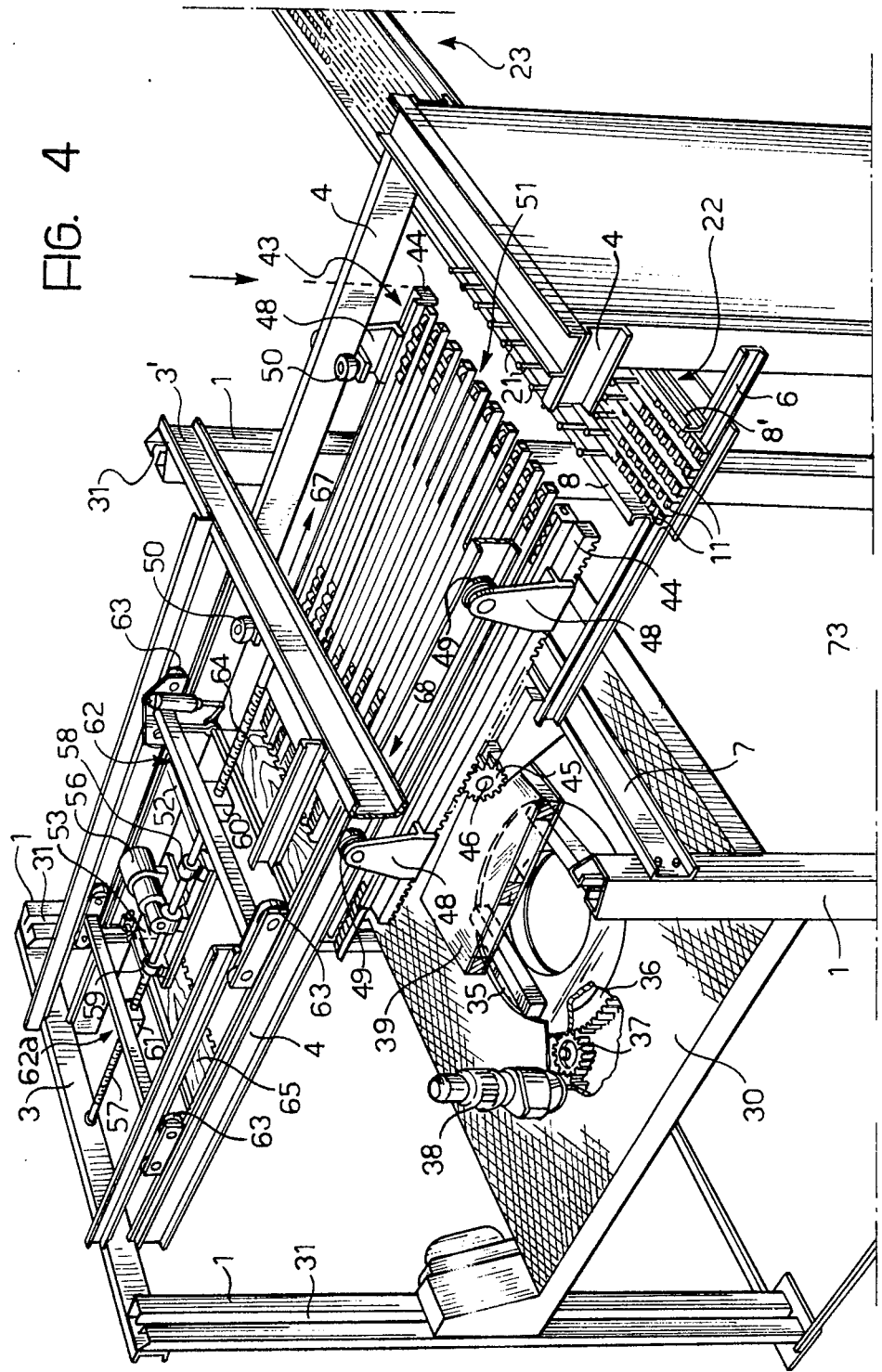

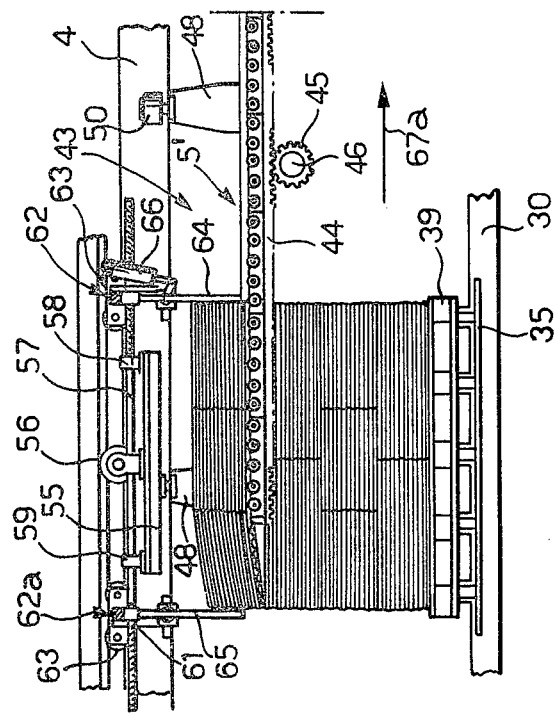
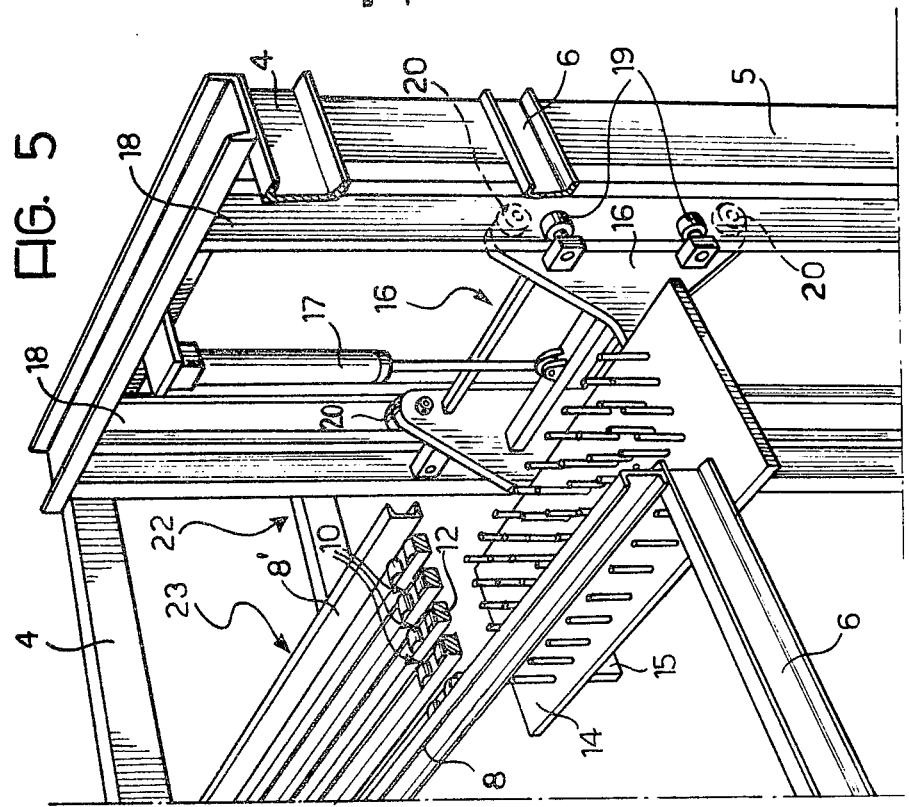

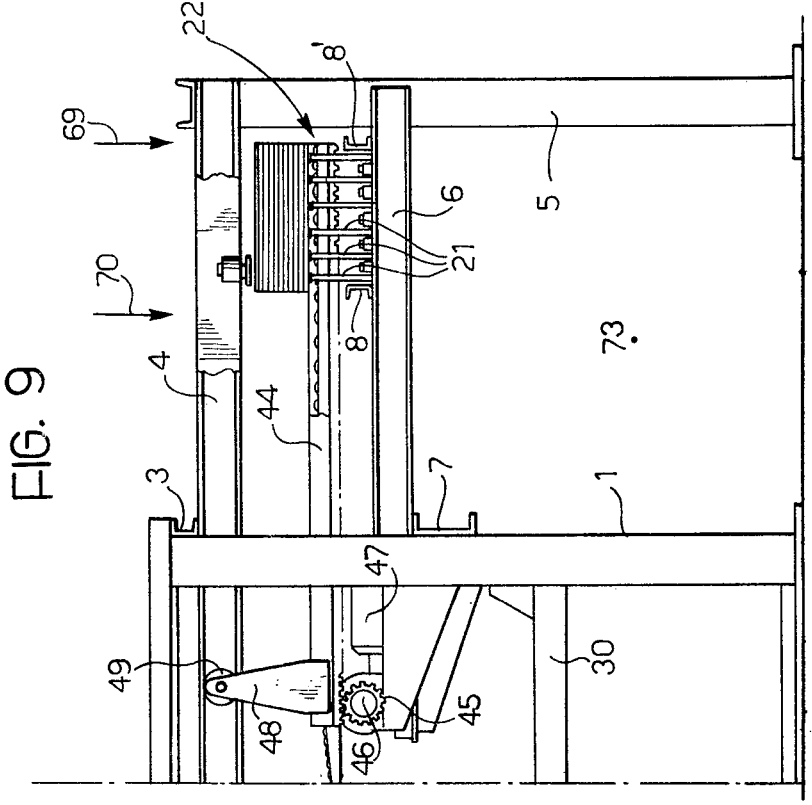

PALLETIZING MACHINE

The present invention relates to palletising machines for stacking rows of articles in layers on a pallet and is particularly suitable for palletising books while still in the form of signatures yet to be sewn together.

Known palletising machines generally comprise a pallet support mounted on the machine framework for vertical movement, an entry station for accumulating a row of articles to be stacked on the pallet, an intermediate support on which rows of articles from said entry station are accumulated above a pallet on said pallet support, a device for removing a loaded pallet from the pallet support, and a control unit arranged to coordinate the operation of the machine such that a plurality of rows of articles are successively transferred from the entry station to the intermediate support from where they are transferred together onto the pallet as a layer of articles, the pallet being thereafter moved down by lowering of the pallet support in order to receive a next layer upon the one just placed.

In the production in particular of books, diaries and the like, the need often arises to store and/or to transport, sometimes over considerable distances, large quantities of printed material which are to undergo further operations after a longer or shorter period of time. Storage and transport of such printed matter can conveniently be achieved by stacking on standardised platforms, or pallets to form a 'load unit' which can be readily moved by a fork lift truck.

Typically, a load unit is composed of a number of layers of goods packed in boxes, crates or casings, placed on a pallet in a predetermined stacking arrangement designed to minimise the work involved in loading the pallet.

Palletising machines of the form described above have been developed to facilitate loading of articles onto pallets. In these known machines the intermediate support generally comprises shutters arranged over the pallet and onto which rows of articles accumulated at the entry station are pushed by a suitable device. When a sufficient number of rows of articles have been transferred onto the shutters to form a layer of articles on the pallet, the shutters are opened to allow the articles to be deposited on the pallet or on the last layer of articles formed on the pallet. The partially loaded pallet is then lowered to receive a next layer of articles.

When the desired number of layers have been placed on the pallet, the loaded pallet is removed from the machine, for example, by a roller conveyor and an empty pallet takes its place on the pallet support which is then raised up to a position underlying the shutters. A new cycle of operation of the machine now commences.

Such palletising machines are, however, unsuitable for palletising articles formed by a pile of flat objects such as may be constituted by a plurality of signatures prior to their joining together to form a book. Furthermore, the known machines are also unsuitable for handling articles which may be damaged by the friction which is produced during the sliding of the packages towards the shutters and during the opening of the latter.

It is therefore an object of the present invention to provide a palletising machine more suited to handling books still in the form of signatures to be bound together and other similar articles.

It is another object of the invention to reduce to a minimum the friction which may be produced during the transfer of articles from the entry station of a palletising machine to the intermediate support and from this member onto the pallet.

These objects are achieved, in accordance with the present invention, in that the entry station of the palletising machine includes part of a roller bed along which articles are supplied to the entry station to form thereat a row of articles extending in a longitudinal direction of the entry station, the roller bed being formed by a plurality of spaced rollers whose axes extend perpendicularly to said longitudinal direction of the entry station, the machine including a lifting device arranged to lift off from the rollers of the entry station a row of articles positioned thereat, and said intermediate support being formed by a carriage horizontally movable along the framework from above a pallet on said pallet support towards the entry station, said carriage including a roller bed formed by rollers whose axes of rotation extend parallel to said longitudinal direction of the said entry station, and the carriage being provided on its side facing the entry station with a receiving section having a plurality of roller rows projecting from the carriage like a comb and forming extensions of the carriage roller bed, the projecting roller rows being so arranged that advance of the carriage towards the entry station is effective to position the roller rows below and across a row of articles lifted off the entry station rollers by said lifting device, and the machine further including two registering elements movable towards each other along said framework to centrally register over the pallet a said plurality of rows accumulated on the carriage to constitute a layer of articles to be deposited on the pallet, said elements also serving to restrain said centered rows from subsequent movement with the carriage whereby such movement is effective to cause the carriage to move from beneath said rows and enable them to descend onto the pallet, the said element nearest the entry station being retractable to a position in which it allows unimpeded transfer of rows onto the carriage.

A palletising machine embodying the invention will now be particularly described, by way of example, with reference to the accompanying diagrammatic drawings, in which:

FIG. 1 is a part-sectional side elevation of the machine;

FIG. 2 is a part-sectional plan view of the machine;

FIG. 3 is an enlarged sectional view of a detail of FIG. 1;

FIG. 4 is an enlarged, cut-away perspective view of the machine showing various elements in different operational positions to those illustrated in FIGS. 1 to 3;

FIGS. 5, 6 and 7 are perspective view which show, to an enlarged scale, further constructional details of the machine;

FIG. 8 is a plan view of part of a roller bed of the machine illustrating the disposition of the unit shown in FIG. 7; and FIGS. 9, 10 and 11 are elevational views showing various elements during certain operational phases of the machine;

As shown in the drawings, the palletising machine has two spaced pairs of hollow uprights 1. The uprights 1 within each pair are symmetrically disposed about a central vertical longitudinal plane 2—2 (see FIG. 2) of the machine and are interconnected at their upper ends by crossmembers 3 and 3' respectively. Two side members 4 are underslung from the crossmembers 3 and 3' to extend symmetrically about the central plane 2—2 parallel thereto. The members 4 are C-shaped in cross-section with their concave sides facing away from the central plane 2—2. The side members 4 extend beyond the cross member 3' and terminate at uprights 5 to which they are welded. The uprights 5 rest on the work area floor and are anchored thereto as are the uprights 1.

Below the part of each side member 4 which extends between the cross member 3' and the corresponding upright 5 is arranged a beam 6 extending parallel to the side member 4. Each beam 6 is secured at one end to the corresponding upright 5 and at its other end to the top of a cross member 7 upon which it rests. The cross member 7 is positioned beneath the cross member 3' and is connected to the same pair of uprights 1 as the member 3'. The beams 6 carry a support framework comprising two long beams 8 and 8' parallel to the cross members 3, 3' and 7. The beams 8 and 8' extend laterally of the plane 2—2 to project beyond the main framework of the machine on one side thereof. Extending between the beams 8 and 8' at regular intervals are rods which support a roller bed.

This roller bed is composed of a plurality of roller units 10 each having a row of needle rollers 11 arranged in a box frame with their axes in spaced parallel relation (see FIG. 6). The roller units 10 seat on the rods 9 at positions defined by cooperating notches 13 provided in the side walls 12 of the box frames and in the rods 9. The positioning of the roller units 10 on the rods 9 is such that the row of rollers 11 of each unit 10 extends parallel to the beams 8 and 8' and such that rollers 11 of each unit 10 align crosswise of the beams 8 and 8' with corresponding rollers 11 of laterally adjacent units 10. The notches 13 and rods 9 also serve to ensure that the rows of rollers 11 are equally spaced from one another and from the beams 8 and 8. The needle rollers 11 and the box frames of the units 10 are made of synthetic resin.

Below the roller bed and the beams 8 and 8' is a horizontal rectangular plate 14 which is carried on horizontal bracket arms 15 of a carriage 16. The carriage 16 is upwardly displaceable under the action of a jack 17 and is guided in this motion by vertical guides 18 which it engages by means of external rollers 19 and internal rollers 20 (see FIG. 5). The width of the plate 14 corresponds substantially to the spacing of the beams 8 and 8' and the length of the plate 14 corresponds to the spacing of the beams 6. A plurality of vertical bolts 21 project upwards from the plate 14. These bolts 21 are arranged in matrix to form longitudinal rows parallel to beams 8 and 8' and crosswise rows orthogonal to the beams 8 and 8' with the heads of the bolts 21 being in vertical alignment with openings through the roller bed delimited by the rods 9, the laterally spaced roller units 10, and at the sides of the bed, the beams 8 and 8'. The length of the bolts 21 and the positioning of the carriage 16 and plate 14 when in a lowered position are such that the heads of the bolts 21 lie below the horizontal plane extending tangentially to the needle rollers 11 of the roller bed. Upon raising of the carriage 16, the bolts 21 are moved up to project through the roller bed.

The portion of the roller bed between the beams 6 will hereinafter be referred to as the 'entry station' 22 of the machine.

The portion 23 of the roller bed extending outside the main frame of the machine may be considered as being upstream of the entry station in terms of how the machine operates. Positioned in the region of the upstream roller bed portion 23 is a device (see FIGS. 7 and 8) for effecting a 90° rotation of objects on the roller bed prior to them being moved along the bed towards the entry station by, for example pusher members (not shown). This device comprises a small rectangular frame 24 positioned across the top of the roller bed and subdivided by means of longitudinal and crosswise bars 25 and 26 in a plurality of square openings through each of which a respective needle roller 11 can project (See FIG. 8). The frame 24 is carried by a shaft 27 which extends downwards from the roller bed through a rotation control device 28 to connect with the piston rod of a jack 29. The rotational control device 28 comprises two oppositely acting jacks interconnected by a rack which meshes with a pinion mounted fast for rotation on the shaft 27 by a splined coupling which allows shaft 27 to slide through the pinion. The jack 29 is arranged to raise the frame 24 above the plane tangent to the tops of the needle rollers 11 in order to lift off these rollers an object carried thereby so that the object can be rotated through 90 by actuation of the control device 28. The position of the shaft 27 and the arrangement of the dividing bars 25 and 26 of the frame 24 is such that, after a 90° rotation of the frame 24 it can be lowered under the action of the jack 29, to place the object lifted by the frame back on the needle rollers 11 of the roller bed for subsequent movement therealong.

The uprights 1 (see FIGS. 1 and 4) serve as guides for a rectangular platform 30. The platform has projections which extend into the internal cavities of uprights 1 through vertical slits 31 provided in the walls of the uprights which extend perpendicularly to the longitudinal plane 2—2 and face towards each other. The platform 30 is suspended by cables or chains 12 (see FIG. 1) which connect with the projections of the platform and pass around guide rollers to drums 33 upon which they are wound. The drums 33 are driven by an electric motor 34. The platform 30 carries in its central zone an annular auxiliary platform 35 rotatably mounted on the bottom of platform 30 and provided with an externally toothed gear ring 36 which meshes with a gear 37 driven via a reduction gear unit, from an electric motor 38 (see FIG. 4).

The annular platform 35 is arranged to carry a pallet 39 upon which objects are to be stacked to form a load unit. The structure of the machine is such that the platform 30 can be lowered down to a level enabling a stacked pallet 39 to be transferred onto a roller conveyor 40 (FIG. 1 and 2) and moved in the direction of arrow 41 towards the exit of the palletising machine.

The annular platform 35 is so mounted on the platform 30 that its axis of rotation 42 (see FIG. 2), and thus the rotational axis of a pallet positioned on the platform 35, lies in the longitudinal central plane 2—2 of the machine.

Since in general, the pallet 39 will have a rectangular form in plan the dimension of the entry station perpendicular to the plane 2—2 (that is, the distance between the beams 6) is selected to be at least equal to the length of the longer sides of a pallet 39. Naturally in designing the machine, account will be taken of the dimensions of the largest size of pallet likely to be handled by the machine. The side members 4 (FIG. 1) serve as support and guide elements for a mobile carriage 43. The carriage 43 comprises a frame which includes a pair of side racks 44 toothed along their undersides and meshing with pinions 45 keyed onto a common shaft 46. The shaft 46 is driven via a worm gear-worm wheel transmission from a motor 47 supported by the cross member 7 of the machine. The racks 44 and the other parts of the carriage frame are suspended from the side members 4 by two pairs of vertical arms 48. Each of said arms 48 carries at its upper end a roller 49 mounted with its axis horizontal and a roller 50 mounted with its axis vertical. The rollers 49 are arranged to roll along the lower flange of the side members 4 while the rollers 50 runs along the inward-facing vertical surfaces of the members 4. The upper face of carriage 43 is formed as a roller bed comprising rows of needle rollers whose axes of rotation extend parallel to the cross members 3, 3' and 7, and thus also parallel to the longitudinal direction of entry station 22 (that is, the direction in which an object moves into the entry station along its roller bed). The carriage 43 has on its side facing the entry station 22 a receiving section 51 in which the carriage roller bed is extended by roller rows which project outwards from the main body of the carriage 43 like a comb (see FIG. 4). The comb-like receiving section 51 is arranged to receive rows of objects from the entry station in a manner to be described hereinafter. When the carriage 43 is advanced towards the entry station, the projecting roller rows of the receiving section 51 extend across the matrix of bolts 21 carried on the plate 14 in such positions relative thereto that upon the plate 14 being fully raised the bolts 21 can pass between these roller rows. Each of these projecting roller rows is formed by needle rollers arranged in a unit similar to the roller units 10 of the entry station roller bed, the axis of the rollers being parallel to the longitudinal direction of the entry station.

In the region above the annular platform 35, one of the side members 4 carries a structure formed by two cross members, 52 and 53 and an inter-connecting beam 55. The cross members 52 and 53 are arranged symmetrically in relation to a plane 54—54 (see FIG. 2) which extends perpendicularly to the central longitudinal plane 2—2 and which contains the axis of rotation 42 of the annular platform 35. The inter-connecting beam 55 lies in the plane 2—2 and carried an electric motor 56. The motor 56 is arranged to drive, via a worm gear-worm wheel gearing, a shaft 57 rotatably mounted in supports 58 fixed to the cross members 52 and 53. The outer end portions of the shaft 57 are externally threaded and respectively engage internally threaded blocks, 60 and 61. The blocks 60 and 61 are fixed to respective carriages 62 and 62a which are symmetrically arranged about the plane 54—54 and run on rollers engaging in guides fixed to the upper faces of the side members 4. Suspended from each of the carriages 62 and 62a is a plate 64 and 65 respectively, the bottom edge of which is castellated to form a comb or rake structure. The plates 64 and 65 lie in a vertical plane; however the plate 64 is arranged to rotate around an axis parallel to the cross members 3 and 3' so that it can be moved into a horizontal position. This rotation is effected by a jack 66 (see FIGS. 2, 4 and 11) such that the plate 64 swings up away from the plane 54—54. The operation of the palletising machine will not be described.

It will be assumed that initially a pallet 39 is arranged on the platform 35 with its longer sides parallel to the longitudinal direction of the entry station. Objects to be stacked on the pallet 39 arrive at the entry station 22 of the machine along the upstream roller bed portion 23 to form at the entry station a first row of objects. The supply of said objects to the entry station may be controlled in a predetermined manner by a control unit C (FIG. 1) which can also be used to coordinate the working of the various members of the machine. The details of such a control unit will not be described herein since it may be of any known type suitably adapted in a manner well appreciated by persons skilled in the art. The actual means used to supply the objects to the upstream portion of the roller bed can comprise, for example, pusher devices or a platform conveyor in which a plurality of platforms are suspended from a chain which passes around a horizontal wheel positioned above the roller bed portion 23.

The machine is well suited to stacking the objects in rows in a number of layers on pallet 39 in cases where the objects are packages such as piles of books in which alternate books, or alternate groups of books, are arranged with their backs facing in opposite directions.

The machine is particularly suited to the case where the books are formed by a stack of signatures which have yet to be joined together by sewing or in some other manner.

The operation of the machine is hereinafter described in connection with the stacking of piles of books.

The control unit is operative to control the length and positioning of a row of piles of books on the roller bed of the entry station 22. Upon a row being completed, the control unit operates the jack 17 to raise the plate 14 to its uppermost position (see FIGS. 1, 2, 4). As the bolts 21 pass through the roller bed of the entry station, they lift the piles of books off the needle rollers 11 and raise them to a level above that of the rollers of the receiving section 52 of the carriage 43. The carriage 43 is then advanced by the motor (activated under the control of the control unit) in the direction of arrow 67 (FIG. 2) that is, towards the right of the drawing, until the projecting roller rows of the receiving section 51 are fully inserted between the portions of the bolts 21 projecting above the roller bed of entry station 22 (see FIG. 9). Advance of the carriage 43 is stopped when the free end of the receiving section 51 reaches an end position indicated by arrow 69.

Next, the control unit caused the jack 17 to lower the plate 14. As the bolts 21 descend, they set the piles of books down upon the receiving section 51 of the carriage 43. The bolts continue descending until they have returned to their starting position (see FIG. 3) in which their heads are below the horizontal plane tangent to needle rollers 11 of the entry station 22. The bolts remain in their starting position until a new row of piles of books has been fed to the entry station.

The piles of books supplied to the entry station of the machine are preferably so arranged that the backs of the books lie parallel to the longitudinal direction of the entry station itself (that is, parallel to the beams 8 and 8'). However, if desired, each pile of books, before arriving at the entry station 22 can be arranged so that the backs of the books are turned perpendicularly to the longitudinal direction of the entry station 22. Turning of a pile of books through 90° can be effected by the device 24–29 as the pile passes along the upstream portion 23 of the roller bed by temporarily arresting the pile over the frame 24 and thereafter activating the device 24-29 to turn the pile through 90.

After a row of piles of books has been placed on the receiving section 51 of the carriage 43, this carriage is moved backwards in the direction of arrow 68 (that is, to the left as viewed in FIGS. 1, 2 and 4) by the action of the motor 47.

Movement of the carriage 43 in the direction of the arrow 68 is stopped when the free end of the receiving section 51 (and thus the pile of books carried thereby) has just cleared the entry station 22 and reached the position shown by arrow 70 (see FIG. 9) so that the formation of a new row of piles of books at the entry station 22 is not impeded.

The operations of forming a row of piles of books at the entry station 22 and transferring the row to the receiving section 51 of the carriage 43, are then repeated under the control of the control unit until enough rows have been transferred to the receiving section to constitute a layer of side by side piles of books, the dimensions of which are such that the layer will substantially cover the upper face of pallet 39.

During the formation of such a layer on the receiving section 51, the row or rows of piles of books already on the receiving section 51 have to be moved back along the carriage 43 in the direction of arrow 68 in order to make room for the next row to be received from the entry station 22. This moving back of the rows takes place during the slow penetration of the comb-like receiving section 51 between bolts 21 when these bolts are stationary in their raised position, supporting the next row to be transferred to the carriage 43. As the carriage 43 is advanced towards the entry station 22, the last transferred row on the receiving section 51 is moved up against the row of books carried on the bolts 21.

Since the row or rows on the carriage 43 are supported on the freely rotatable needle rollers of the carriage roller bed whereas the row carried by the bolts 21 is not roller-supported, the rows on the carriage move back with ease to make room for the row on the bolts 21 to be placed on the receiving section 52 of the carriage 43.

Of course, the row constituting the last row of a layer to be transferred onto the pallet, does not undergo such a displacement relative to the carriage 43 and will rest on the receiving section 51 of the carriage 43 until the transfer of the layer onto the pallet 39.

When the required number of rows of equal height piles of books have been transferred to the carriage 43, the carriage is moved in the direction of arrow 68 (to the left in the drawings) and stopped in an end of run position in which the central part of the carriage lying between vertical arms 48 is arranged above pallet 39. In this position of the carriage 43, the free end of the receiving section 51 of the carriage is in the position indicated by arrow 71 in FIG. 1 and the opposite end of the carriage, which slopes downwards away from the receiving section 51, projects beyond the plate 65.

Next, the plate 64, which previously occupied a horizontal position, is lowered into a vertical position (shown dashed in FIG. 1) by operation of the jack 66 under the control of the control unit. The control unit then turns on the motor 56 to cause the shaft 57 to rotate in such a sense that the carriages 62 and 62a, carrying the plates 64 and 65 respectively, move towards each other in the directions indicated by arrows 72 and 73 (see FIG. 1). Such movement ceases when the facing vertical surfaces of the plates 64 and 65 are coincident with vertical planes arranged symmetrically on opposite sides of plane 54—54 at a spacing from each other equal to the width that the layer of books to be deposited on the pallet should have measured in the direction of the longitudinal plane 2—2 (this distance will of course depend on the dimensions of the books and on the number of rows). The plates 64 and 65 thus act to precisely position the layer of books carried by the carriage 43 which enables the layer to be placed exactly in the required position on pallet 39 (or on a layer of books previously placed on the pallet if the loading operation of this is in a more advanced phase).

To transfer the layer of books from the carriage 43 to the pallet 39, the control unit energises the motor 47 to advance the carriage 43 back towards the entry station in the direction indicated by arrow 67. Since the plate 64 is held by the jack 66 in its vertical position, the layer of books does not move with the carriage 43 but comes off the end of the carriage onto the pallet 39 positioned immediately below. The carriage 43 is advanced to its end of run position indicated by arrow 69 in FIG. 9 and by the time it has reached this position, the layer of books has been completely transferred from the carriage 43 to the pallet 39. Only then is the plate 64 moved back, under the control of the control unit, to its initial horizontal position.

The control unit now controls the motors 33 and 38 to lower platform 30 by an amount corresponding to the thickness of a layer of books and to effect rotation of the annular platform 35 through 90° in order to change the direction of the rows of the next layer of books in relation to the edges of pallet 39. Since rotation of the platform 35 through 90° will align the shorter sides of the pallet with the longitudinal direction of the entry station 22, the control unit is programmed to cause the formation of shorter rows at the entry station 22 during the assembly of the next layer of books. This shortening of the rows is effected by appropriate control of the means used to supply the piles of books to the entry station 22 along the roller bed portion 23, these means being controlled not only to provide the correct number of piles in each row but also to ensure that, as for the first layer, the lateral middle plane of a row formed at the entry station coincides with the longitudinal plane 2—2 of the machine.

The formation of the next layer of books on the carriage 43 and its transfer onto the preceding layer deposited on pallet 39, then proceeds in substantially the same manner as described above for the formation and transfer of the first layer. However, the control unit allows an increased number of rows of piles of books to be transferred to the carriage 43 to make up this next layer in order to take account of the fact that the longer sides of the pallet 39 now extend parallel to the plane 2—2 of the machine. Furthermore, when the carriages 62 and 62a, which are moved back to their starting positions at the beginning of the formation of the second layer, are subsequently moved towards each other to center the piles of books on the carriage 43, the actual final spacing of the carriages 62 and 62a and of the plates 64 and 65 is made greater than for the previous layer.

The build up of layers on the pallet 39 is continued in the above described manner until as many layers as possible have been formed on pallet 39, the number of such layers being a function of the design of the machine since this will determine when the pallet 39 has moved down to a level where it is required to be unloaded by means of a pusher or with other means, (not illustrated) onto the roller conveyor 40. A loaded pallet transferred to the conveyor 40 may either be lifted off by means of a fork lift truck, or be transported by the conveyor itself, if the rollers are driven rollers, to its destination. Meanwhile, another pallet may be loaded onto the platform 35 by a loader (not illustrated) arranged, for example, in the space 73 (FIG. 1) which separates the entry station 22 from the region of the main framework formed by the uprights 1 interconnected by the cross members 3, 3' and 7.

From the foregoing it will be appreciated that the control unit can be programmed to enable the loading of pallets of different dimensions and/or to cause the pallet to be rotated after the formation thereupon of each layer or of a predetermined number of layers. Furthermore, the control unit can be set to take into account the dimensions of the books which may vary from time to time.

We claim:

1. A palletising machine for stacking rows of articles in layers on a pallet, the machine comprising
   a framework,
   a pallet support mounted on the framework for vertical movement,
   an entry station with a roller bed extending in a longitudinal direction of the entry station and serving to accumulate a row of articles to be stacked on a pallet, said roller bed being formed by a plurality of spaced rollers whose axes extend perpendicularly to said longitudinal direction of the entry station,
   a lifting device arranged to lift off from the rollers of the entry station a row of articles positioned thereat,
   an intermediate support on which a plurality of rows of articles from said entry station are accumulated above a pallet positioned on said pallet support prior to their transfer as a layer onto the pallet, said intermediate support being formed by a carriage horizontally movable along the framework from above the pallet towards the entry station, said carriage including a roller bed formed by rollers whose axes of rotation extend parallel to said longitudinal direction of the entry station, and the carriage being provided on its side facing the entry station with a receiving section having a plurality of roller rows projecting from the carriage like a comb and forming extensions of the carriage roller bed, the projecting roller rows being so arranged that advance of the carriage towards the entry station is effective to position the roller rows below and across a row of articles lifted off the entry station rollers by said lifting device whereby lowering of said lifting device results in said row of articles being placed upon the receiving section,
   two registering elements movable towards each other along said framework to centrally register over the pallet a said plurality of rows accumulated on the carriage, said elements also serving to restrain said centered rows from subsequent movement with the carriage whereby such movement is effective to cause the carriage to move from beneath said rows and enable them to descend onto the pallet, the said element nearest the entry station being retractable to a position in which it allows unimpeded transfer of rows onto the carriage, and
   a control unit arranged to coordinate the operation of the machine such that a plurality of rows of articles are successively transferred from the entry station to the intermediate support carriage from where they are transferred together onto the pallet as a layer of articles, the pallet being thereafter moved down by lowering of the pallet support in order to receive a next layer upon that just placed.

2. A machine according to claim 1, in which the roller bed of the entry station comprises
   a framework formed by two spaced horizontal side members connected to each other by a plurality of crosswise rods arranged at regular intervals, and
   a plurality of roller units supported on said rods in spaced relation from each other and from the said side members, each said roller unit being formed by a box frame supporting a plurality of spaced needle rollers, and the roller units being so arranged that said needle rollers align in rows longitudinally and laterally of said entry stations.

3. A machine according to claim 2, in which said box frame and needle rollers of each roller unit are made of synthetic resin.

4. A machine according to claim 2, in which said lifting device comprises
   a horizontal plate situated below the roller bed of the entry station, and
   a plurality of bolts carried on said horizontal plate and each vertically aligned with a respective opening in the roller bed delimited by said crosswise rods together with the roller units and the side members of the entry station, said horizontal plate being vertically movable between a normal lowered position in which the upper ends of the bolts lie below the level of the tops of the needle rollers and a raised position in which the bolts project through said openings in the roller bed to lift off from said needle rollers a row of articles positioned thereupon.

5. A machine according to claim 4, in which said horizontal plate is mounted on a carriage slidable in vertical guides and arranged to be moved by a fluid operated jack.

6. A machine according to claim 1, in which the roller bed of the intermediate support carriage is downwardly sloped away from the entry station on the side of the carriage remote therefrom.

7. A machine according to claim 1, in which the intermediate support carriage is arranged to run along horizontal guides extending perpendicularly to said longitudinal direction of the entry station, the carriage including two spaced racks extending parallel to the guides and arranged with their teeth directed downwards, each rack meshing with a pinion keyed onto a shaft which extends laterally of the carriage guides and which is rotatably drivable by an electric motor supported by the framework of the machine.

8. A machine according to claim 1, in which said retractable registering element comprises a plate mounted for rotation about a horizontal axis transversely to the movement direction of the intermediate support carriage, the plate when operative lying in a vertical plane and being retractable by rotation about said horizontal axis to lie in a horizontal plane.

9. A machine according to claim 8, in which both said registering elements are formed by plates movable along said framework to lie in vertical planes containing the two opposite edges of the pallet which extend parallel to the longitudinal direction of the entry station, each plate being carried by a respective carriage movable along the machine framework and provided with an internally screw-threaded member through which extends a screw-threaded shaft rotatably drivable from a motor carried on the framework of the machine, the arrangement of the screw threads being such that rotation of said shaft is effective to move said registering plates in opposite directions.

10. A machine according to claim 1, in which said pallet support comprises
   a main platform vertically movable in the machine framework, and
   an auxiliary annular platform rotatably mounted on the main platform and arranged to carry a said pallet, rotation of said auxiliary platform being effected by a motor via a reduction gear with both the motor and reduction gear being mounted on the main platform.

* * * * *